Patented Aug. 30, 1949

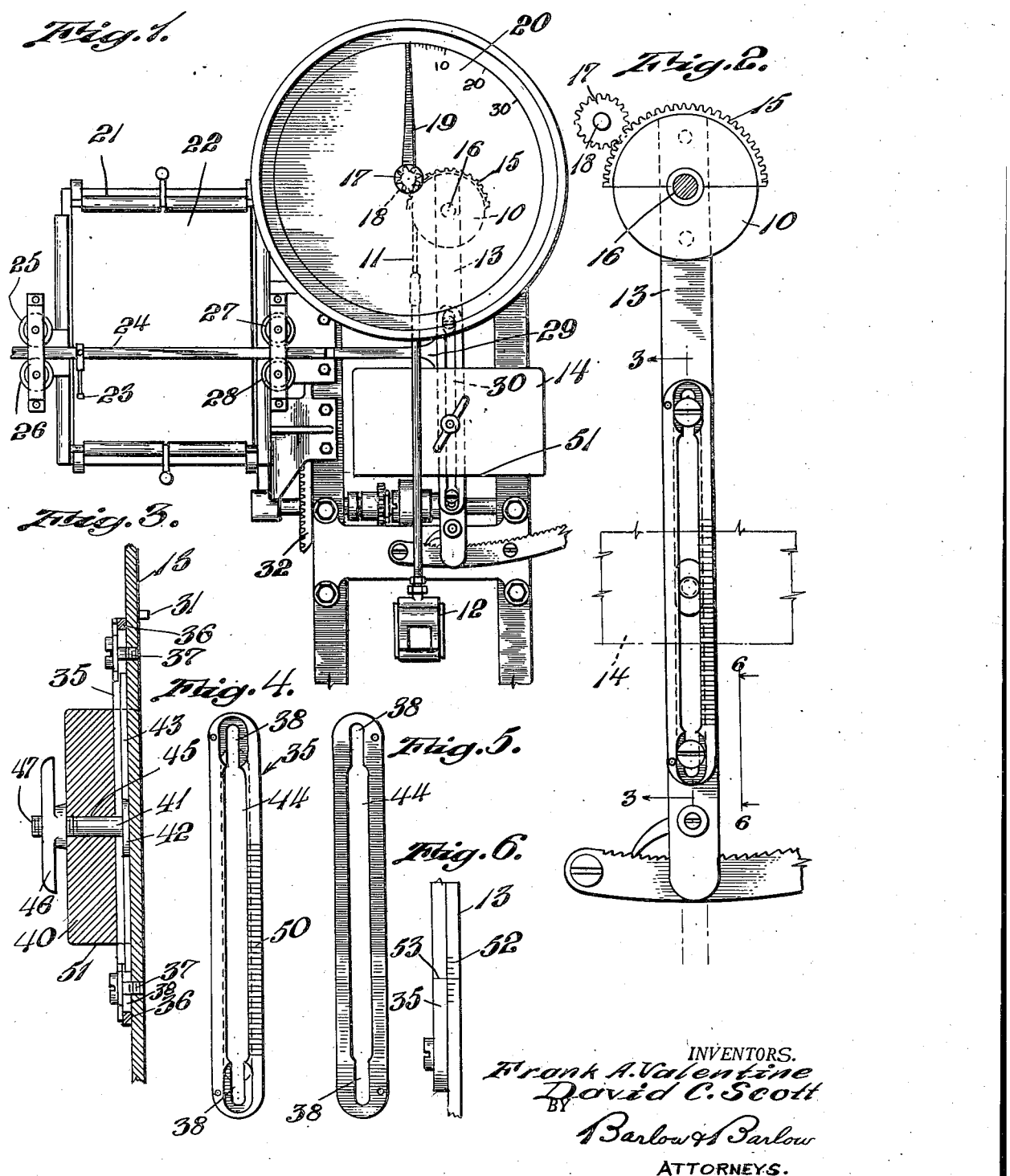

2,480,779

UNITED STATES PATENT OFFICE 2,480,779

WEIGHT ARM FOR TESTING MACHINES

David C. Scott, Providence, and Frank A. Valentine, Apponaug, R. I., assignors to Scott Testers, Inc., a corporation of Rhode Island Application February 27, 1947, Serial No. 731,356

4 Claims. (Cl. 73—98)

1

This invention relates to a testing machine and more particularly to the weight arm of such testing machine upon which the weight is mounted.

A testing machine, such as illustrated in Patent No. 1,679,751, dated August 2, 1928, provides a weight which may be adjusted along a lever arm for applying various resistances to the pull of the specimen as it is being tested; the arrangement being such that, assuming one dimension of the cross section of the specimen is constant, the weight may be adjusted to compensate for variations in the other dimension of the cross section. It frequently happens that the specimens to be tested, although they are designed to be uniform, vary in both width and thickness; and, in a machine as above indicated, there is no arrangement provided for compensating for the two dimensions should they vary. Consequently, additional calculations must be made in order that the machine of the character above indicated may be used for comparative results.

One of the objects of this invention is to provide a compensation which may be made for varying widths of the test specimen and compensation which may be made for varying thicknesses of the test specimen by a simple movement of the parts of the machine.

More specifically an object of this invention is to utilize adjustments of the weight on the lever arm in accordance with two scales one for one dimension and another for another dimension.

With these and other objects in view, the invention consists of certain novel features of construction as will be more fully described and particularly pointed out in the appended claims.

In the accompanying drawings:

Fig. 1 is a fragmental elevation showing the lever arm with the weight mounted thereon in its relation to the other mechanism of the machine;

Fig. 2 is an elevation on a larger scale showing the lever arm with the weight removed although indicated in dot-dash lines;

Fig. 3 is a sectional view on line 3—3 of Fig. 2 with the weight in position;

Fig. 4 is an elevation of the weight carrying member separate from the lever arm showing the front thereof;

Fig. 5 is a view similar to Fig. 4 but showing the back of this arm;

Fig. 6 is a fragmental edge elevational view looking on substantially line 6—6 of Fig. 2.

In proceeding with this invention, we have mounted upon the weight lever arm of the machine a weight carrying member in a spaced relation to the lever arm so that the weight may be secured to this member in various adjusted positions along the member, and we have secured this carrying member to the lever arm in such a manner that it is also capable of adjustment with relation to the lever arm. A scale is provided for indicating the position of the weight on the member, and another scale is provided for indicating the relative position of the member and lever arm. Thus, where the specimen is rectangular, we may utilize one of these scales for setting the weight on the member for a certain width of specimen tested, and we may utilize the other scale setting the weight and member for various thicknesses of specimens tested; and, thus, after the specimen is measured, the machine may be set correspondingly so that comparative results of the two specimens may be indicated directly on the chart of the machine without further compensation.

With reference to the drawings, 10 designates a drum to which a strap 11 is secured which is attached to a specimen grip clamp 12. The other clamp for the other end of the specimen is omitted in this showing. This drum 10 has secured to it a lever arm 13 which carries a weight 14 to apply resistance to the pull of the specimen being tested. A portion of a gear 15 is secured to the drum 10 also having as its center the shaft 16 which gear meshes with the pinion gear 17 on the staff 18 to rotate the same and move the pointer 19 over the dial 20. A platen 21 is provided on the machine with a marking surface 22 over which the writing instrument 23 is drawn for providing a mark upon the chart to indicate the characteristics of the specimen. This marking instrument 23 is carried by a rod 24 guided by the rollers 25 and 26 on one side and 27 and 28 on the other side so as to direct its movement. This rod 24 has a cross head 29 provided with a slot 30 which engages a pin 31 on the lever arm so as to cause movement of this rod across the chart. A gear train, a portion of which is shown at 32, is caused to rotate to cause movement downwardly of the marking surface 22.

The lever arm 13 has a weight carrying member designated generally 35, and shown by itself in Figs. 4 and 5, mounted on the lever arm 13 in spaced relation thereto by spacing means 36, the same being held by the screws 37 which pass through the end slots 38 of the member 35 so as to adjustably mount this member 35 on the lever arm 13. This member with its spacer blocks 36 may be thus adjusted vertically along the lever and held in desired position by the screws 37.

A weight 40 is carried by this member 35 by means of the T bolt 41 having a head 42 slidable in the space 43 between the lever arm 13 and the member 35; this bolt extending through the larger slot 44 in this member 35 and passing through the opening 45 in the weight 40 to receive the thumb nut 46 on the threaded end 47 of the screw 41 so as to hold the weight 40 clamped upon the member 35.

A scale 50 is provided on the front face of the member 35 and by adjusting the weight along this scale so that its lower edge 51 comes at a certain location along the scale, the effective position of the weight may be indicated. This scale may be utilized for compensating for various widths of specimens of a rectangular cross section. Should the specimens vary in thickness, another scale will be utilized. This scale is designated 52 and is along the edge of the lever arm 13 as shown in Fig. 6. A datum line 53 is provided on the member 35 near the lower edge thereof to cooperate with this scale 52, and should there be some variation in thickness from the standard adopted, this member 35 may be adjusted along the lever arm 13 in accordance with the scale 52 so that compensation for varying thicknesses of specimens may be provided. By this arrangement, it is merely necessary to measure the width and thickness of the specimen having a rectangular cross section and then, by setting the weight along the scale 50 to correspond to any variation from a standard of the width of the specimen and setting the entire member and its weight along the scale 52 to compensate for variations in thickness of the specimen from a standard, the test may be performed and results recorded on the chart which will correspond with the tests of a standard dimension specimen which has been adopted; thus making it unnecessary to shift the chart or perform calculations to reduce variations from the standard to the standard level adopted.

We claim:

1. In a testing machine, a lever arm which is mounted to swing in response to pull on a specimen being tested, a weight carrying member on said lever arm, a weight adjustably mounted on said member to vary the load on the lever arm, a scale to indicate the relative position of said weight on said member, and means to adjustably mount said member on said lever arm to vary the load on the lever arm and a scale to indicate the relative position of said member on said lever arm.

2. In a testing machine as set forth in claim 1 wherein said carrying member has a longitudinal slot and a weight holding means is received through said slot and is movable along said member.

3. In a testing machine as set forth in claim 1 wherein said carrying member has slots and means extending through said slots to secure said carrying member to said lever arm in adjusted position thereon.

4. In a testing machine as set forth in claim 3 wherein said carrying member has another slot and means extending through said last mentioned slot to secure said weight to said carrying member in adjusted position thereon.

DAVID C. SCOTT.
FRANK A. VALENTINE.

REFERENCES CITED

The following references are of record in the file of this patent:

UNITED STATES PATENTS

| Number | Name | Date |
|---|---|---|
| 648,868 | Hartshorne | May 1, 1900 |
| 989,471 | Abraham | Apr. 11, 1911 |
| 1,515,034 | Griswold | Nov. 11, 1924 |
| 1,679,751 | Stevenson | Aug. 7, 1928 |
| 1,878,192 | Scott | Sept. 20, 1932 |
| 1,987,787 | Miller | Jan. 15, 1935 |